United States Patent [19]

Ludden

[11] Patent Number: 4,548,073

[45] Date of Patent: Oct. 22, 1985

[54] TROLL METER

[76] Inventor: Theodore E. Ludden, 191 Solmar Dr., Sequim, Wash. 98382

[21] Appl. No.: 599,554

[22] Filed: Apr. 12, 1984

[51] Int. Cl.⁴ ............................................. G01C 21/10
[52] U.S. Cl. ......................................... 73/185; 73/187
[58] Field of Search ................... 73/185, 187, 170 A, 73/195

[56] References Cited

U.S. PATENT DOCUMENTS 93,513  8/1869  Banare ................................. 73/185

FOREIGN PATENT DOCUMENTS 29094  10/1884  Fed. Rep. of Germany ........ 73/187

Primary Examiner—Donald O. Woodieu

[57] ABSTRACT

This troll meter is used to determine the speed of a boat in the range of one to three knots. Primarily, it consists of a shaft having three marked and different pitched propellers, which are rotated by the forward speed of the boat, and each is freely and rotatably received on shaft 11.

3 Claims, 3 Drawing Figures

TROLL METER

This invention relates to speed indication devices, and more particularly to a troll meter.

The principal object of this invention is to provide a troll meter, which will be designed to be employed in determining the speed of a boat, in the speed range of one to three knots.

Another object of this invention is to provide a troll meter, which will be adapted to be employed underwater at one side of the boat, so as to enable the operator of the boat to observe the motion of its propellers and correlate same with desirable boat speed, as the meter is being trolled.

Another object of this invention is to provide a troll meter, which will be of such design, as to include at least three propellers, positioned in a spaced relationship on a single shaft, to attain the desired function, as above described.

A further object of this invention is to provide a troll meter, which will have each propeller distinctly marked in a suitable manner, and the propellers will be suitably mounted in a frame, to bring them underwater.

A still further object of this invention is to provide a troll meter, which will be so designed, as to have each propeller of a different pitch, to achieve the desired results, and each will be free wheeling on their common shaft.

Other objects are to provide a troll meter, which is simple in design, inexpensive to manufacture, rugged in construction, easy to use, and efficient in operation.

These, and other objects, will be readily evident, upon a study of the following specification, and the accompanying drawing, wherein.

Figure 1:
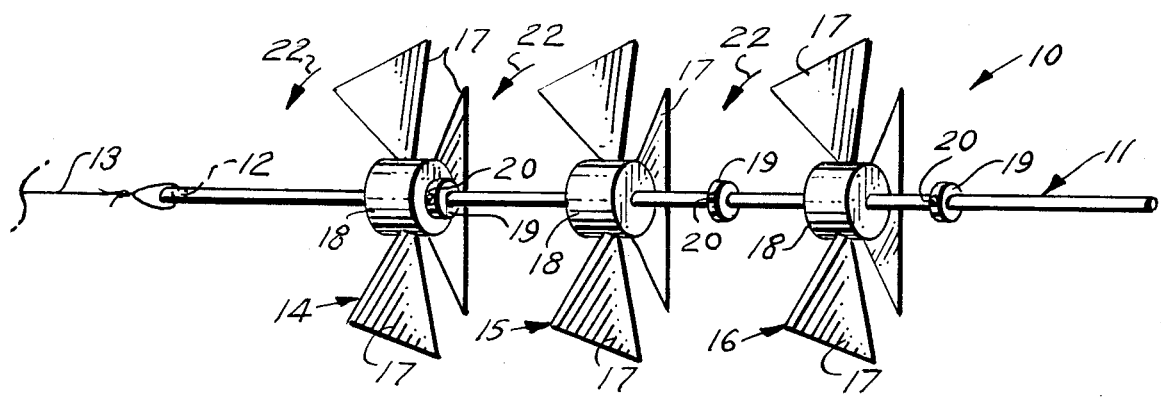
FIG. 1 is a perspective view of the present invention.
Figure 2:
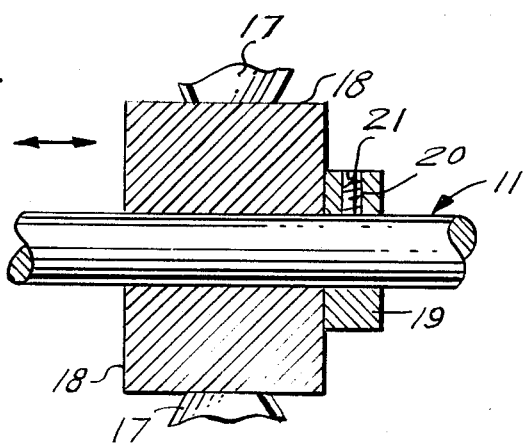
FIG. 2 is an enlarged horizontal and fragmentary cross-sectional view of FIG. 1.
Figure 3:
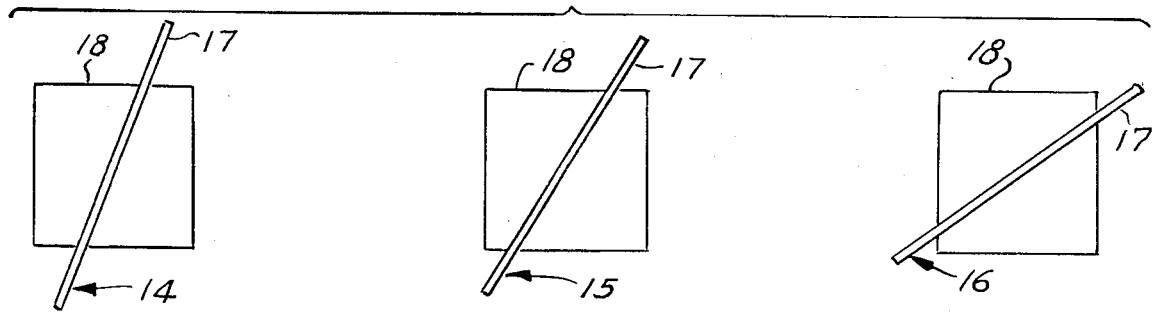
FIG. 3 is a diagrammatic plan view of the hubs of the invention, shown fragmentary and illustrating the varying angles of pitch of the three propeller elements.

Accordingly, a troll meter 10 is shown to include an elongated shaft 11, which is suitably mounted in a weighted frame (not shown), for holding meter 10 under water when in use. Shaft 11 includes an opening 12 through one end, which receives a line 13 that is tied thereto, for attachment to a fixture of the boat, so as to troll meter 10. Three propellers 14, 15, and 16 are provided, and each includes three blades 17, which are radially and equally spaced on the longitudinal axis of the hubs 18. The hubs 18 are freely and rotatably received on shaft 11, and propellers 14, 15, and 16 are spaced from each other on shaft 11, by means of three collars 19, which are secured to shaft 11 by a set screw 20, received in a threaded opening 21 therethrough. Each propeller 14, 15, and 16 is of a different pitch, as is illustrated in the FIG. 3 diagram, and each is also distinctly marked, in a suitable manner (not shown), and each rotates at a different speed on shaft 11, when the meter 10 is being trolled alongside of the boat, so as to enable the user to correlate the rotation thereof, with the desirable boat speed.

In operation, the meter is placed in the water alongside of the boat, and line 13 is secured to any desired fixed point aboard the boat. The weight of the frame holding meter 10 will keep the meter 10 underwater, and the shaft 11 will maintain a substantially horizontal position when the boat is moving forward. The propellers 14, 15, and 16 will rotate freely on shaft 11, by the impact of water flow on their blades 17, and each will rotate at a different speed, which, by the operator's observation, will enable him to correlate the meter 10 with desirable boat trolling speed which is in the range of one to three knots.

It shall be noted, that the direction of rotation of 14, 15, and 16 is in the same direction as is indicated by means of arrows 22, and the collars 19 serve as stop means on shaft 11 for 14, 15, and 16.

While various changes may be made in the detail construction, it is understood that such changes will be within the spirit and scope of the present invention, as is defined by the appended claims.

What I now claim is:

1. A troll meter for boats, comprising, in combination, a shaft, propellers having different pitches received on said shaft, collars received on said shaft, and a line to said shaft.

2. The combination as set forth in claim 1, wherein said propellers are three in number, and each is marked differently from the others, in a suitable manner.

3. The combination as set forth in claim 2, wherein said propellers each include a central hub, which is freely and rotatably received on said shaft by the impact of water force thereon, when said meter is underwater and towed by a line attached to said boat.

* * * * *